United States Patent Office 3,522,069
Patented July 28, 1970

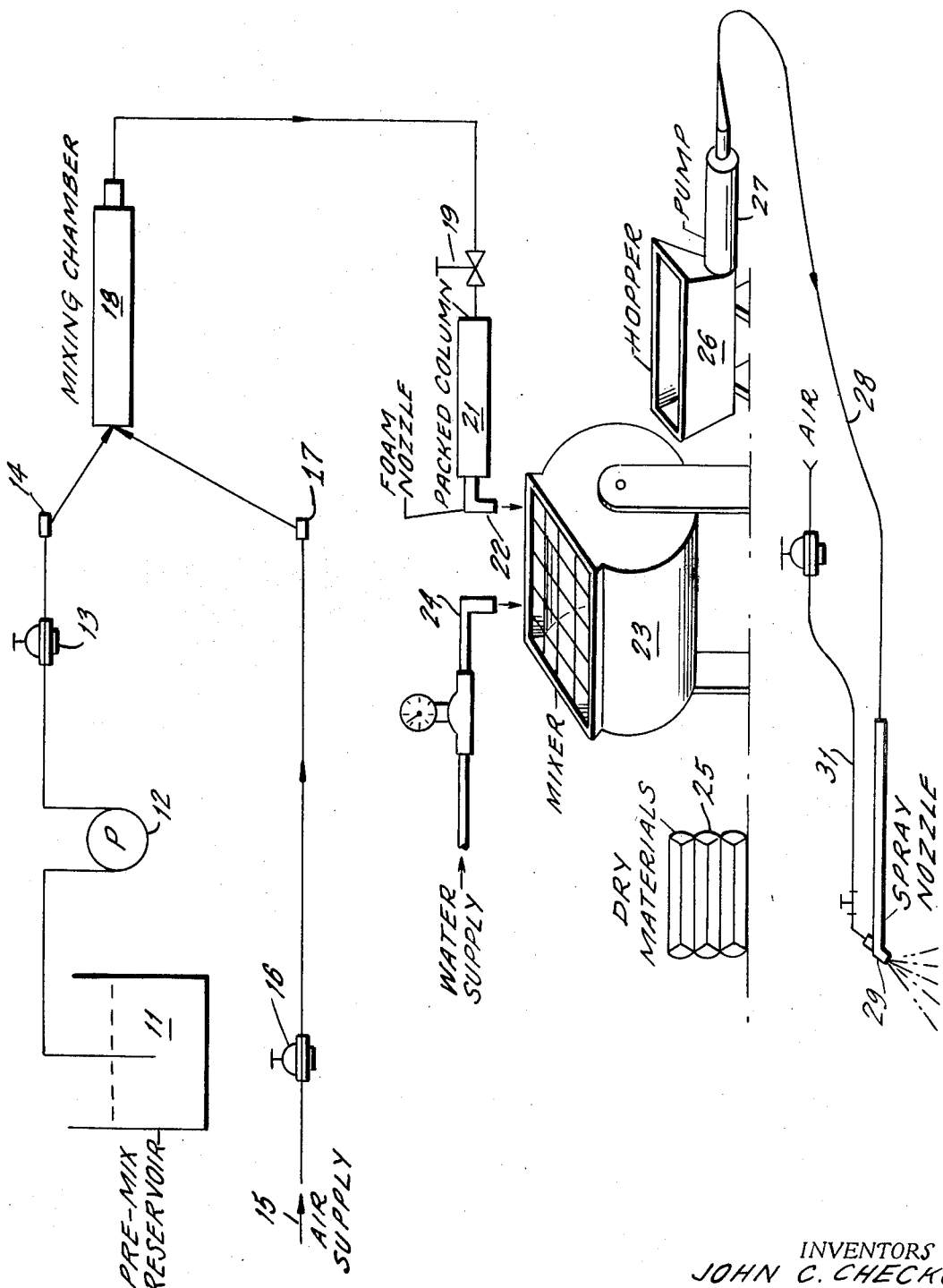

3,522,069
METHOD FOR THE PREPARATION AND APPLICATION OF FOAMED MAGNESIA CEMENTS
John C. Checko, Somerville, and Harold Umansky, Plainfield, N.J., assignors to The Mearl Corporation, Ossining, N.Y., a corporation of New Jersey
Filed June 1, 1967, Ser. No. 642,906
Int. Cl. C04f 9/00, 31/04
U.S. Cl. 106—88                                       9 Claims

ABSTRACT OF THE DISCLOSURE

Method for preparing and applying a foamed magnesia cement by initially pre-forming an aqueous foam, thereafter adding the pre-formed foam to a slurry of magnesia, a magnesium salt, and asbestos or other fibers to form the foamed cement, and spraying the thus formed and pumped foamed material upon the desired structural substrate. Air-dried foamed cement layers thus prepared are useful for fireproofing and like purposes.

BACKGROUND OF THE INVENTION

Field of the invention

This invention relates to a method for the preparation and application of a foamed magnesia cement, and more particularly to the preparation and application of such cements of the magnesium oxysulfate or magnesium oxychloride types, which cements are useful as sprayed-on fireproofing materials for the protection of structural steel and other members.

Description of the prior art

Foamed magnesia cement formulations are, of course, well known. Such formulations have, for example, been described in Denning U.S. Pat. No. 2,598,981 granted on June 3, 1952; Harrell U.S. Pat. No. 3,147,128 granted on Sept. 1, 1964; and Harrell et al. U.S. Pat. No. 3,238,-155 granted on Mar. 1, 1966.

Foamed magnesia cements, such as described in the above patents, are conventionally prepared by simply mixing the several solid and liquid constituents thereof in a paddle mixer, dumping the same into a hopper, and finally spraying the product cement upon the surface to be treated. The mechanical agitation thus imparted to the mixture by means of the folding and shearing action of the mixer paddles effects the entrainment of air in the cement slurry and thus reduces the density of the composition. Control of the density of the foamed composition and the amount of aeration produced is, however, limited and dependent upon a number of factors including but not limited to the composition and quantity of foaming agent employed, the efficiency and duration of the mixing, the quantity of water admixed, the air and water temperatures, the water hardness, etc. Moreover, much of the aeration produced by mixing or beating the cement composition is lost during pumping of the mixture to its desired point of application and spraying the same thereat.

The use of high speed mixing techniques for forming foamed magnesia cements by so-called "in situ" foam formation thus requires both extended mixing cycles and cannot readily be utilized to accurately control the density of the foamed composition produced at the point of application. The art has recognized the deficiencies of such techniques and various suggestions have been made to provide improved procedures for the preparation of foamed magnesia cement. Thus, in Sommer U.S. Pat. No. 3,138,472 granted on June 23, 1964 a technique is proposed for initially forming a stable foam of a bitumen emulsion by mechanical agitation, followed by the addition of the magnesia constituent of the desired cement to the pre-formed foam. In Harrell et al. U.S. Pat. No. 3,119,704 granted on Jan. 28, 1964, a different procedure is suggested, involving a particular, relatively exacting air injection technique for mixing the slurry of cementitious material to be foamed with the foaming agent.

The last mentioned techniques have not, however, proven satisfactory in commercial operations. Thus, as noted in the last mentioned Harrell et al. patent, the addition of the dry, solid constituents of magnesia cements to pre-formed foams results in at least the partial collapse of the air bubbles within such foams, thereby making it exceedingly difficult to obtain uniform density foamed cements employing such technique. Moreover, it is difficult in commercial operations to insure the precise and critical air-slurry mixing conditions required in accordance with procedures such as described in the last mentioned Harrell et al. patent.

SUMMARY OF THE INVENTION

In accordance with the present invention, a method has been provided for preparing and applying foamed magnesia cements of precise and determinable densities, without the necessity for prolonged or complex techniques for effecting aeration of the cement formulations. Specifically, it has been discovered that such foamed magnesia cements may be readily prepared by initially pre-forming an aqueous foam by aerating a solution of a foaming agent in water, the foam thus prepared incorporating a predetermine volume of air per volume of the solution aerated, within the range of from 1 to 50 volumes of air per volume of such solution; and thereafter adding the preformed foam to an aqueous slurry of magnesia, a magnesium salt, and a fibrous constituent, in the proportion of from 0.5 to 5 parts by volume of the foam per part of the slurry. The foamed cement composition thus prepared may be directly pumped to the point of application, sprayed upon a suitable substrate, and the resulting layer air-dried to form foamed layers useful for fireproofing or acoustical insulation and having precisely determinable dry densities of from about 5 to 30 pounds per cubic foot.

The stable pre-formed foams employed in the practice of the present invention are prepared by admixing the air with the foaming agent solution within a packed column, the air bubbles being entrapped within the liquid film formed by such solution. Such bubbles are not collapsed when the foam is added to the aqueous slurry containing the cement constituents. Thus, by initially wetting the dry components of the cement within the aqueous slurry, absorption of water from the bubble walls and consequent weakening thereof (such as occurs when the dry ingredients are added per se to a pre-formed foam or mixed directly during aeration) is prevented. A stable foamed cement is thus prepared which may be pumped over long distances and applied by conventional spray techniques without substantial increase in the wet foam density.

It is noted that it has previously been proposed to form other aerated cementitious materials by adding a pre-formed foam to a slurry incorporating the solid constituents of the desired product. Such a technique is described, for example, in Dilnot U.S. Pats. Nos. 3,062,669 and 3,144,346 granted on Nov. 6, 1962 and Aug. 11, 1964, respectively, in connection with the manufacture of aerated calcium silicate hydrate products. The Dilnot procedures relate to the formation of molded or cast forms by autoclaving the calcareous and siliceous materials foamed to indurate the same and thereby form the rigid calcium silicate hydrate matrix. These patents thus do not relate to the formation of foamed magnesia cement products which, unlike silicate hydrates, do not require treatment at elevated temperatures to develop the final chemical composition. Moreover, the Dilnot procedures do not pertain to the manufacture of materials which may be pumped substantial distances and applied by conventional spray techniques to form large surface area foamed cement layers, e.g., roof decks, without substantial increases in their wet densities.

The method here of is suitably employed in the application of magnesia cement layers for fireproofing, or thermal or acoustical insulation, of various structural substrates employed in the construction field. Thus, the present method may conveniently be utilized for the protection of structural steel members, tanks, pipe, air ducts and floor and roof deck systems against fire damage, or in the production of sprayed-on acoustical treatment of ceilings and walls. The method is equally applicable to the treatment of steel, pre-stressed concrete or other suitable substrates which may be employed in the above or similar applications.

In the following description it will be understood that the reference to foamed magnesia cements is intended to include such cements of both the magnesium oxysulfate and magnesium oxychloride types, i.e., those cements prepared by the reaction of magnesia (magnesium oxide, usually derived from burnt magnesite) with either magnesium sulfate or magnesium chloride, as the case may be.

As indicated hereinabove, the pre-formed foam employed in the practice of the present method is initially prepared by aerating a solution of a suitable foaming agent in water. For such purpose any of the known foaming agents, such as those described, for example, in the above mentioned U.S. Pats. Nos. 2,598,981; 3,062,669; 3,138,472; and 3,147,128, may be utilized, provided they produce foams which are stable during both the formation and subsequent pumping and spraying operations. It has been found preferable to employ foaming agents of either the hydrolyzed protein or alkyl sulfate types; the latter type of foaming agent including the ethoxylated alkyl sulfates as well as the unsubstituted materials themselves. Particularly satisfactory foamed cements have been produced employing the hydrolyzed protein foaming agent commercially available from the Mearl Corporation under the trademark AIROCEL PK.

Employing the present invention only relatively small proportions of foaming agent need be incorporated in the pre-formed foam to nevertheless effect sufficient air entrtpment to produce foams incorporating from as little as about 1 volume of air per initial volume of the foaming agent-water solution to as much as about 50 volumes of air per volume of such initial solution. Generally, the foaming agent may be incorporated in the solution to be aerated (termed the "pre-mix" solution herein) in amounts of from about 2% to 20% by weight thereof, it being generally desirable to utilize 1 part by weight of the foaming agent per 15 parts of the pre-mix. Such solution has been found to provide both a fluid stable foam which may be pumped normal distances and heights and to impart inherent economies in material requirements. When the foamed cement must be pumped greater distances or to greater heights, the concentration of foaming agent is increased to provide additional stability with respect to the added friction and pumping pressures imposed. The concentration of foaming agent to water in the pre-mix may thus be increased, as noted above, to as much as 1 part by weight of the foaming agent per 4 parts of the water. On the other hand, when the foam need not be pumped relatively great distances or heights, the concentration of foaming agent to water may be reduced to the 2% level to provide additional economy and yet maintain sufficient stability in the foamed cement.

The foam thus formed is added to an aqueous slurry of the cement-forming constituents, viz., magnesia, the desired magnesium salt, and the fibrous constituent imparting the desired fireproofing or other characteristics to the cement. While either magnesium chloride or magnesium sulfate, generally in the form of Epsom salt ($MgCO_4 \cdot 7H_2O$) may be utilized as the magnesium salt component of the composition, it is preferred to employ the latter salt when magnesia cements for application to steel substrates, for example, are desired. It will be understood that magnesium oxychloride cements may rather be prepared and applied in accordance with this invention when it is desired to coat substrates, such as reinforced concrete, which are not subject to corrosion problems.

The fibrous constituents incorporated in the cement-forming slurry suitably comprise asbestos, rock wool or glass fiber materials, depending upon the particular application in question. The use of asbestos fibers is, of course, particularly desirable for fireproofing materials.

It will be understood that other additives conventionally incorporated in magnesia cements may additionally be included in the slurries treated during the practice of the invention, so long as such materials do not impair the stability of the pre-formed foam added thereto. Thus, for example, hydrated gypsum may be incorporated in the cementitious composition to impart improved fireproofing characteristics thereto.

The relative proportions of the respective constituents of the magnesia cement slurry, and the proportions in which the pre-formed foam may be added to such slurry depend upon the intended application for the foamed cement product and the prescribed specifications, whether by code or otherwise, therefor. The dry density, and hence the composition, of the foamed magnesia cement product formed by the present method may be accurately regulated by controlling the proportions of the various cementitious materials and metering the rate of production of the pre-formed foam relative to the cementitious slurry. Hence, the technique hereof may be used to comply with any predetermined specifications, both as to the dry density of the magnesia cement product and the composition thereof.

Desirably, magnesia cement slurries containing the following ingredients, in the proportions specified, may be employed in the present method:

| Ingredient: | Parts by weight |
| --- | --- |
| Magnesia | 5–35 |
| Magnesium salt | 5–35 |
| Fibrous constituent | 30–90 |
| Water | 100–200 |

By adding appropriate proportions of the pre-formed foam to such slurry compositions, foamed cements may be produced which, even after pumping considerable distances and employing conventional spray application techniques, will air-dry to form cementitious layers having dry densities of from as little as 5 pounds per cubic foot to about 30 pounds per cubic foot. Such densities may generally be obtained by metering the addition of pre-formed foam to the slurry composition in the proportion of from about 1 to 3 volumes of the foam per volume of the slurry admixed therewith.

BRIEF DESCRIPTION OF THE DRAWING

The attached drawing is a schematic flow sheet illustrating the preparation and application of foamed magnesia cement products in accordance with the present method.

DESCRIPTION OF THE PREFERRED EMBODIMENTS

As illustrated in the drawing, a liquid foaming agent concentrate is initially diluted with water to form the pre-mix which is suitably charged to a pre-mix reservoir 11. A pump 12 feeds the pre-mix through a liquid pressure regulator 13 and a liquid orifice 14 which accurately controls the quantity of pre-mix aerated. Simultaneously, air is fed from supply 15 through an air pressure regulator 16 and a similar air orifice 17 into admixture with the pre-mix solution in a mixing chamber indicated schematically at 18.

If desired, the pre-mix solution may be maintained within a pressurized pre-mix reservoir rather than in an open reservoir such as indicated at 11. In such instance, a suitable compressed air source may be employed both to maintain the pre-mix under pressure in its reservoir and to supply the air admixed with such solution in mixing chamber 18.

The mixture of air and liquid flows from the mixing chamber 18 through valve 19, and into a packed column 21 in which the stable pre-formed foam is produced. The column 21 suitably contains a porcelain filtering material which disperses and homogenizes the mixture of air and pre-mix, forming a foam similar in appearance to that of shaving lather produced from a pressurized can.

Since the pressures of both the pre-mix and the air feeds are controlled and maintained against the orifices 14 and 17 by the pressure regulators 13 and 16 a constant and measurable rate of foam flow is produced at any desired expansion ratio. For instance, should the air orifice be closed, only pre-mix will flow. As the air orifice is opened, air is introduced into and entrapped by the liquid in the packed column, forming the desired foam. The ratio of air to liquid produces the volumetric increase in the foam material. Thus, a foam which incorporates about 50 volumes of air per original volume of the pre-mix will possess a density of only about 1.26 pounds per cubic foot, as compared with a density of approximately 63 pounds per cubic foot for the initial pre-mix.

The foam formed in the packed column 21 is delivered through a foam nozzle 22 attached thereto, for addition to the magnesia cement slurry. The slurry is prepared in a mixer 23, into which the water may be metered through line 24 and the dry cementitious materials 25 added manually or otherwise. It will be understood that the magnesia, magnesium salt, and fibrous constituents of the cement may either be added separately or pre-measured and pre-packaged for simultaneous charging into the mixer. In either event, the dry materials are initially blended and thoroughly wetted to form the desired slurry, prior to adding the foam thereto.

The foam is thereafter injected into the mixer from foam nozzle 22 and the mixture briefly mechanically agitated to thoroughly blend the pre-foamed foam with the slurry. The desired proportions of foam to slurry are accurately controlled by metering the volume of foam fed, either by a mechanical timing means or an automatic electrical shutoff of the foam flow. The foamed magnesia cement thus prepared is discharged from the mixer 23 into a suitable holding hopper 26, from which it is pumped by pump 27 to its point of application. The foam may thus be pumped through any suitable flexible or rigid conduit or hose 28 for application through a conventional spray nozzle 29, providing the spray pattern necessary for proper coverage of the surface to be protected or treated. The spray nozzle may, if desired, be actuated by means of air pressure through line 31.

The following specific examples illustrate various magnesia cement compositions which may be prepared and applied in accordance with this invention:

Example 1.—Magnesia cement incorporating a low proportion of asbestos fibers

A pre-mix incorporating 1 part by weight of a foaming agent (AIROCEL PK) per 15 parts of water is aerated in packed column 19 to produce a foam having a density of 2.1 pounds per cubic foot. 2.71 cubic feet of the foam are then added in mixer 23 to an equal volume of a slurry incorporating 30 pounds of asbestos fiber, 35 pounds of calcined magnesia, 35 pounds of Epsom salt, and 100 pounds of water. The resulting foamed cement has a wet density of 38 pounds per cubic foot and an approximate dry density after pumping, spray application and air-drying, of 20 pounds per cubic foot.

Example II.—Magnesia cement incorporating a high proportion of asbestos fibers

A pre-mix incorporating 1 part by weight of a foaming agent (AIROCEL PK) per 15 parts of water is aerated in packaged column 19 to produce a foam having a density of 2.1 pounds per cubic foot. 11.73 cubic feet of the foam are then added to 3.91 cubic feet of a magnesia cement slurry (3:1 volumetric ratio). The slurry consists of five pounds of Epsom salt, five pounds of calcined magnesia, and 90 pounds asbestos fiber. The resulting foamed cement has a wet density of 20.7 pounds per cubic foot and an approximate dry density after pumping, spray application, and air-drying, of 6.5 pounds per cubic foot.

The method of the present invention thus provides an improved technique for preparing and applying foamed magnesia cements, which technique is relatively simple to carry out and efficient in operation. Moreover, use of the method hereof facilitates the formation of stable foamed magnesia cements which may be pumped over relatively long distances and applied by conventional spray application techniques, and which nevertheless produce air-dried products having dry densities of as low as 5 pounds per cubic foot. Since various changes may be made in the preferred embodiments of the present method without departing from the scope of the invention, it is intended that the preceding description be construed as illustrative and not in a limiting sense.

What is claimed is:

1. A method for the preparation and application of a foamed magnesia cement, which comprises:
   (a) pre-forming an aqueous foam by aerating a solution of a foaming agent in water, the foam thus prepared incorporating a predetermined volume of air per volume of the solution aerated within the range of from 1 to 50 volumes of air per volume of said solution;
   (b) mixing magnesia, a magnesium salt selected from the group consisting of magnesium sulfate and magnesium chloride, and a fibrous constituent selected from the group consisting of asbestos, rock wool, and glass fibers in an aqueous slurry;
   (c) adding the pre-formed foam to said slurry in the proportion of from 0.5 to 5 parts by volume of the foam per part of the slurry;
   (d) pumping the thus foamed cement to the point of application;
   (e) spraying the foamed cement upon a suitable substrate to form a layer thereon; and
   (f) air-drying said layer to convert the same to a foamed magnesia cement having a dry density of from 5 to 30 pounds per cubic foot.

2. The method as defined in claim 1, in which the pre-formed foam is prepared in step (a) by admixing air with the solution of said foaming agent within a packed column to entrap the air bubbles within the liquid film formed by said solution.

3. The method as defined in claim 1, in which said foaming agent is an alkyl sulfate anionic surfactant or a hydrolyzed protein surfactant.

4. The method as defined in claim 1, in which the solution aerated in step (a) consists essentially of from 2% to 20% by weight of said foaming agent in water.

5. The method as defined in claim 4, in which the slurry to which the pre-formed foam is added in step (c) consists essentially of the following ingredients in the proportions specified.

| Ingredient: | Parts by weight |
|---|---|
| Magnesia | 5–35 |
| Magnesium salt | 5–35 |
| Fibrous constituent | 30–90 |
| Water | 100–200 |

6. The method as defined in claim 1, in which the slurry to which the pre-formed foam is added in step (c)

consists essentially of the following ingredients in the proportions specified.

| Ingredient: | Parts by weight |
|---|---|
| Magnesia | 5–35 |
| Magnesium salt | 5–35 |
| Fibrous constituent | 30–90 |
| Water | 100–200 |

7. The method as defined in claim 1, for the fireproofing of structural steel members, in which the pre-formed foam prepared in step (a) consists essentially of an aerated solution of from 2% to 20% by weight of a hydrolyzed protein foaming agent in water, said foam incorporating from 1 to 15 volumes of air per volume of said solution; and in which the aqueous slurry to which the pre-formed foam is added in step (c) consists essentially of from 5 to 35 parts by weight of magnesia, from 5 to 35 parts by weight of magnesium sulfate, from 30 to 90 parts by weight of asbestos fibers, and from 100 to 200 parts by weight of water.

8. The method as defined in claim 7, in which the pre-formed foam consists essentially of 1 part by weight of said foaming agent per 15 parts of water and has a foam density of 2.1 pounds per cubic foot; the aqueous slurry to which the pre-formed foam is added consists essentially of 35 parts by weight of calcined magnesia, 35 parts by weight of Epsom salt, 30 parts by weight of asbestos fiber, and 100 parts by weight of water; and in which a given volume of said pre-formed foam is added in step (c) to an equal volume of said aqueous slurry to form a foamed cement having a low fiber ratio, a wet density of 38 pounds per cubic foot and, after pumping, spraying and air-drying as set forth in steps (d), (e) and (f), a dry density of 20 pounds per cubic foot.

9. The method as defined in claim 7, in which the pre-formed foam consists essentially of 1 part by weight of said foaming agent per 15 parts of water and has a foam density of 2.1 pounds per cubic foot; the aqueous slurry to which the pre-formed foam is added consists essentially of 5 parts by weight of calcined magnesia, 5 parts by weight of Epsom salt, 90 parts by weight of asbestos fiber, and 200 parts by weight of water; and in which 3 volumes of said pre-formed foam are added to each volume of said aqueous slurry to form a foamed cement having a high fiber ratio, a wet density of 20.7 pounds per cubic foot and, after pumping, spraying and air-drying as set forth in steps (d), (e) and (f), a dry density of 6.5 pounds per cubic foot.

References Cited

UNITED STATES PATENTS

| 3,458,327 | 7/1969 | Fraser | 106—107 |
| 3,147,128 | 8/1964 | Harrell | 106—105 |
| 2,598,981 | 6/1952 | Denning | 106—107 |
| 3,138,472 | 6/1964 | Sommer | 106—88 |
| 3,119,704 | 1/1964 | Harrell et al. | 106—88 |
| 2,915,301 | 12/1959 | Selden | 106—88 |
| 2,864,714 | 12/1958 | Dixon et al. | 106—88 |

OTHER REFERENCES

"Concrete Technology and Practice," W. H. Taylor, 1956, pp. 352 and 353.

TOBIAS E. LEVOW, Primary Examiner

W. T. SCOTT, Assistant Examiner

U.S. Cl. X.R.

106—105, 106, 107; 117—16, 27, 127, 137; 252—8.1

Notice of Adverse Decision in Interference

In Interference No. 97,774, involving Patent No. 3,522,069, J. C. Checko and H. Umansky, METHOD FOR THE PREPARATION AND APPLICATION OF FOAMED MAGNESIA CEMENTS, final judgment adverse to the patentees was rendered Jan. 14, 1975, as to claims 1–7.

[*Official Gazette May 6, 1975.*]